D. BOYD.
Saw-Gumming Machines.

No. 147,039. Patented Feb. 3, 1874.

WITNESSES:

INVENTOR:
D. Boyd
BY
ATTORNEYS.

UNITED STATES PATENT OFFICE.

DAVID BOYD, OF VEVAY, INDIANA.

IMPROVEMENT IN SAW-GUMMING MACHINES.

Specification forming part of Letters Patent No. 147,039, dated February 3, 1874; application filed November 15, 1873.

*To all whom it may concern:*

Be it known that I, DAVID BOYD, of Vevay, in the county of Switzerland and State of Indiana, have invented a new and useful Improvement in Machine for Gumming Saws, of which the following is a specification:

This invention relates to a machine for gumming circular and other saws, designed more especially for large circular saws, but not confined exclusively thereto; and it consists in the construction and arrangement of parts hereinafter described.

Figure 1:
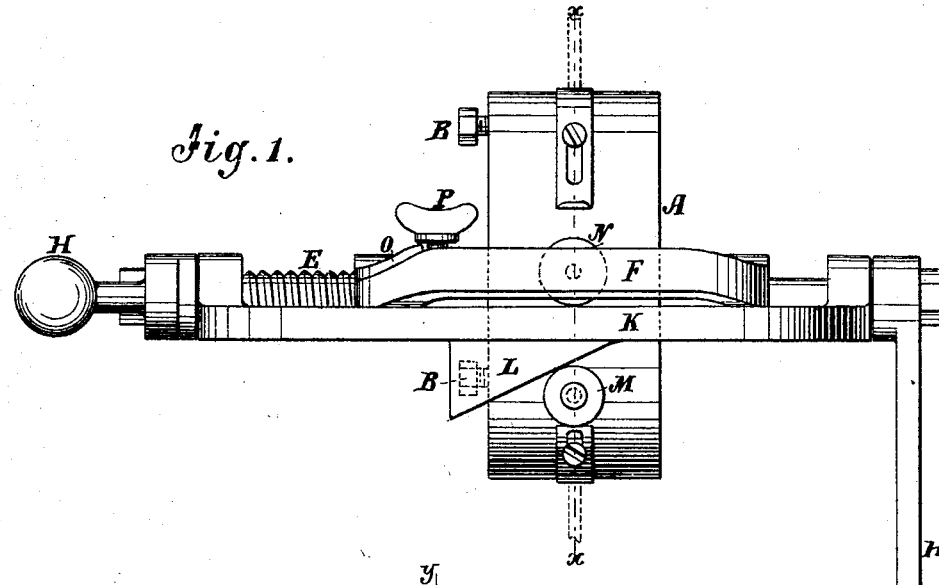
Figure 2:
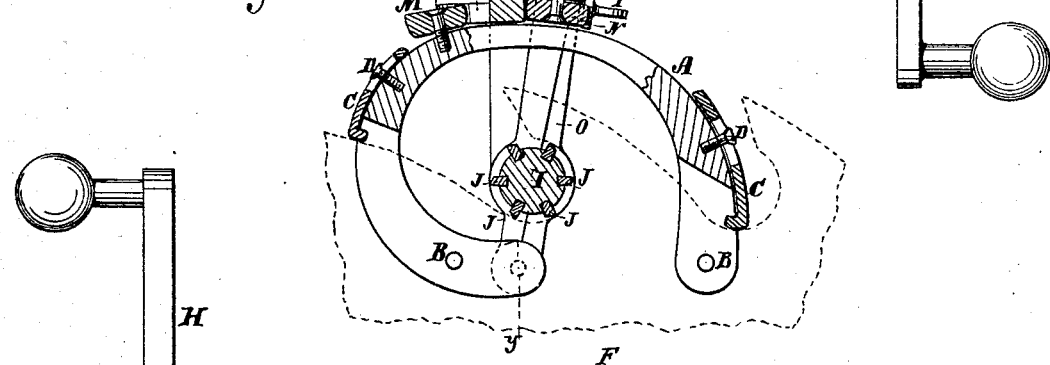
Figure 3:
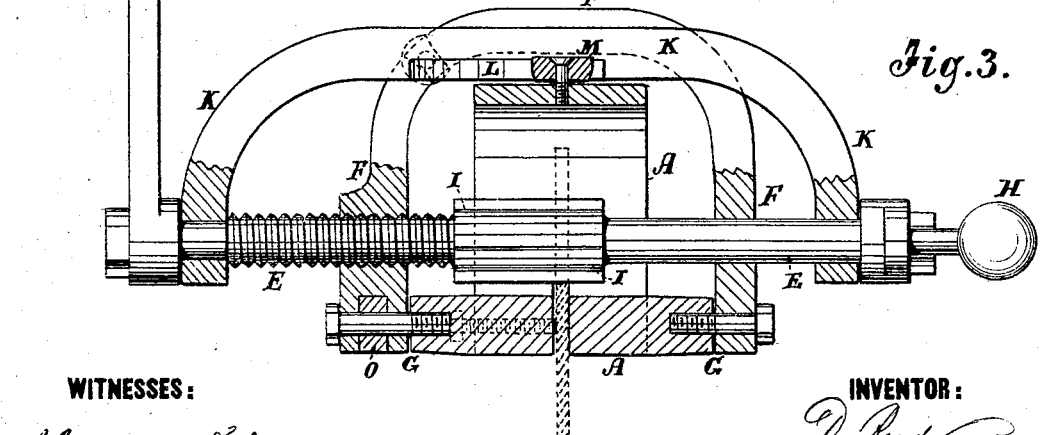

In the drawing, Figure 1 is a side view of the machine. Fig. 2 is a cross-section of Fig. 1, taken on the line $x\,x$. Fig. 3 is a section of Fig. 2 on the line $y\,y$.

Similar letters of reference indicate corresponding parts.

A is a curved slotted piece of metal, in which the saw to be gummed is rigidly confined by means of set-screws B B. C C are adjustable gages, by which the position of the saw is controlled. These gages are fastened in the desired position by the screws D D, (see Fig. 2,) the saw being seen in dotted lines. This bed-piece A resembles in form the letter C, the ends being slotted to admit the saw. E is a mandrel, supported by a curved D-shaped frame, marked F, which is pivoted to the bed-piece A at the points G G. (See Fig. 3.) Through one side of this frame the mandrel works with a screw-thread, and consequently it has a longitudinal motion when it is revolved. H H are the cranks on the ends of the mandrel. I is the cutting-cylinder at or near the middle of the mandrel, formed by an enlargement of the mandrel, which is grooved to receive cutters J, more or less in number. As the mandrel revolves, these cutters operate upon the saw, and, being moved longitudinally, they have a drawing cut, and this lateral movement prevents the cutters from heating, and consequently losing their temper. K is a bail on the mandrel, (confined between the cranks,) which moves back and forth with the longitudinal movement of the mandrel. On this bail is a wedge, L, which works between the two rollers M N, the former of which is on the back of the bed-piece A, and the latter on the frame F. The effect is to force the cutting-cylinder under the teeth of the saw as the mandrel moves along. The screw-nut through which the mandrel works is in two parts, one part being a clamp hinged to the frame F, as indicated at O, which turns over onto the frame, and onto the mandrel, and is fastened by a screw-button. (Seen at P.)

The grooves of the cylinder and the cutters are made slightly dovetailing and tapering, so that when the cutters are operating upon the saw the tendency is to force them into the grooves, and not to loosen them. These cutters can be readily removed for renewal when worn out, and can be ground when dull, without taking them from the cylinder, by removing the mandrel.

The cylinder is larger than the mandrel in diameter, and is made to correspond with the diameter of the saw.

This machine is applied to large circular saws without taking the saws from their arbors, and may be applied to reciprocating saws, if desired, with nearly equal facility.

With this machine, the usually tedious operation of gumming the saw is rendered easy, expeditious, and perfect.

Having thus described my invention, I claim as new and desire to secure by Letters Patent—

1. In a saw-gumming machine, the mandrel E, carrying a cutter or reamer, I, and provided with a screw-thread at one end, so as to adapt it to receive a rotary and progressive or longitudinal movement, as herein shown and described.

2. In combination with the cutter-mandrel, receiving a rotary and longitudinal motion, as set forth, the curved bail K, mounted on the cutter-mandrel, and provided with a wedge, L. which operates in concert with the friction-rollers M N, or their equivalents, for imparting a lateral movement to the cutter-mandrel, substantially as set forth.

3. The C-shaped bed-piece A, frame F, and bail K, in combination with a mandrel and cutting-cylinder, substantially as and for the purpose described.

DAVID BOYD.

Witnesses:
 WILLIAM STEVENSON,
 B. A. STEVENSON.